United States Patent
O'Dell et al.

(10) Patent No.: US 9,569,848 B2
(45) Date of Patent: Feb. 14, 2017

(54) ADVANCED AIRCRAFT VISION SYSTEM UTILIZING MULTI-SENSOR GAIN SCHEDULING

(71) Applicant: Gulfstream Aerospace Corporation, Savannah, GA (US)

(72) Inventors: Robert O'Dell, Savannah, GA (US); Stephen Landers, Savannah, GA (US); Gary Freeman, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 14/708,687

(22) Filed: May 11, 2015

(65) Prior Publication Data

US 2016/0035080 A1    Feb. 4, 2016

Related U.S. Application Data

(60) Provisional application No. 61/992,010, filed on May 12, 2014.

(51) Int. Cl.
| | | |
|---|---|---|
| *G06K 9/00* | (2006.01) | |
| *G06T 7/00* | (2006.01) | |
| *H04N 5/232* | (2006.01) | |
| *G02B 27/01* | (2006.01) | |

(52) U.S. Cl.
CPC .......... *G06T 7/004* (2013.01); *H04N 5/23232* (2013.01); *G02B 2027/014* (2013.01); *G02B 2027/0138* (2013.01); *G06T 2207/10048* (2013.01); *G06T 2207/20221* (2013.01); *G06T 2207/30241* (2013.01); *G06T 2207/30252* (2013.01)

(58) Field of Classification Search
CPC ........... G06T 7/004; G06T 2207/10048; G06T 2207/20221; G06T 2207/30241; G06T 2207/30252; H04N 5/23232; G02B 2027/0138; G02B 2027/014
USPC ......................................................... 382/103
See application file for complete search history.

(56) References Cited

U.S. PATENT DOCUMENTS

| | | | | |
|---|---|---|---|---|
| 5,585,791 A | * | 12/1996 | Paterson ................ | G01C 5/005 340/963 |
| 6,850,185 B1 | * | 2/2005 | Woodell .................. | G01S 13/93 342/29 |
| 7,382,288 B1 | | 6/2008 | Wilson et al. | |

(Continued)

OTHER PUBLICATIONS

United States International Searching Authority, International Search Report and Written Opinion for International Application No. PCT/US15/30117 mailed Jan. 12, 2016.

(Continued)

*Primary Examiner* — Amara Abdi
(74) *Attorney, Agent, or Firm* — Lorenz & Kopf, LLP (LKGlobal)

(57) ABSTRACT

An enhanced vision system is provided for an aircraft performing a landing maneuver. Accordingly to non-limiting embodiments, a processor onboard the aircraft receives data from sensors or systems onboard the aircraft and determines a position of the aircraft relative to a runway using the data. Responsive to this determination, the processor adjusts the gain of a first vision system and a second vision system. Images from the first vision system and the second vision system are merged and displayed to the pilot until the completion of the landing maneuver.

20 Claims, 4 Drawing Sheets

(56) References Cited

U.S. PATENT DOCUMENTS

| | | | | |
|---|---|---|---|---|
| 7,605,774 B1* | 10/2009 | Brandt | ............... | G02B 27/01 |
| | | | | 340/972 |
| 8,963,742 B1 | 2/2015 | Seah | | |
| 2003/0007689 A1* | 1/2003 | Huniu | ............... | H04N 5/243 |
| | | | | 382/169 |
| 2009/0040071 A1* | 2/2009 | Heyn | ............... | B64F 1/20 |
| | | | | 340/953 |
| 2010/0036548 A1* | 2/2010 | Nichols | ............... | G01C 23/00 |
| | | | | 701/4 |
| 2011/0086325 A1* | 4/2011 | Allon | ............... | A61C 8/0006 |
| | | | | 433/80 |
| 2011/0089325 A1* | 4/2011 | Ottney | ............... | G01J 5/02 |
| | | | | 250/333 |
| 2011/0106345 A1 | 5/2011 | Takacs et al. | | |
| 2012/0007979 A1* | 1/2012 | Schneider | ............... | G01J 3/36 |
| | | | | 348/116 |
| 2013/0207887 A1* | 8/2013 | Raffle | ............... | G02B 27/00 |
| | | | | 345/156 |
| 2014/0104693 A1 | 4/2014 | Manjon Sanchez | | |
| 2014/0333510 A1 | 11/2014 | Wischmeyer | | |

OTHER PUBLICATIONS

Krebs, W.K., et al., Psychophysical assessments of image-sensor fused imagery, Human Factors, 44, 257-271, Naval Postgraduate School, Monterey, California.

* cited by examiner

ADVANCED AIRCRAFT VISION SYSTEM
UTILIZING MULTI-SENSOR GAIN
SCHEDULING

RELATED APPLICATION

This application claims the benefit of U.S. Provisional Application No. 61/992,010 filed May 12, 2014.

TECHNICAL FIELD

Embodiments of the present invention generally relate to aircraft, and more particularly relate to vision systems for an aircraft that provide enhanced vision information for pilots.

BACKGROUND OF THE INVENTION

A pilot attempting to land an aircraft during flight is presented with several challenges to perform a safe landing maneuver. During a landing maneuver, the aircraft must properly approach an airport runway along a glideslope, touchdown aligned with the runway and slow to a stop or an appropriate ground speed within the runway distance remaining after touchdown. A landing maneuver is even more challenging in low visibility conditions. Weather conditions or low light conditions may make it difficult or impossible for the pilot to clearly see the runway or runway conditions.

Accordingly, it is desirable to assist a pilot during the approach and landing phase of flight. Other desirable features and characteristics will become apparent from the subsequent summary and detailed description and the appended claims, taken in conjunction with the accompanying drawings and the foregoing technical field and background.

SUMMARY

The disclosed embodiments relate to an aircraft and an enhanced vision system, comprised of one or more sensors, that can be used in the aircraft while performing a landing maneuver. Accordingly to non-limiting embodiments, a processor onboard the aircraft receives data from sensors or systems onboard the aircraft and determines a position of the aircraft relative to a runway using the data. Responsive to this determination, the processor adjusts the gain of a first vision system and a second vision system. Images from the first vision system and the second vision system are merged and displayed to the pilot until the completion of the landing maneuver.

DESCRIPTION OF THE DRAWINGS

Embodiments of the present invention will hereinafter be described in conjunction with the following drawing figures, wherein like numerals denote like elements.

DESCRIPTION OF EXEMPLARY
EMBODIMENTS

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following description.

The disclosed embodiments relate to an advanced vision system for an aircraft. Many contemporary business jet manufacturers provide a visual guidance system (VGS) commonly referred to as a heads-up display (HUD). Typically, the VGS is combined with enhanced vision system which provides an infrared (IR) image that is overlaid with the HUD symbology and provides pilots with the ability to see through some conditions that would be obscured to the unaided eye. The disclosed embodiments merge the advantages of the infrared vision system with imagery from a second vision system which is selected to have a different effective range from the IR Systems. One non-limiting example of a suitable second vision system comprises a millimeter wave (MMW) vision system. While the following description presents the disclosed embodiments in terms of a MMW system, it will be appreciated that numerous other second vision systems having a different effective range than the IR system could be employed in any particular implantation. Non-limiting examples include: weather radar, LIDAR or other IR sensors having a different wavelength. Images from the infrared vision system and the millimeter wave system are gain adjusted prior to being merged and presented to the pilot. The gain adjustments are made automatically responsive to the aircraft's position (altitude or distance) relative to the runway and does not require any adjustments or attention by the pilot. In some embodiments, the gain adjustments are made using a Runway Visual Range (RVR) factor to make supplemental adjustment in the gain depending upon the RVR during the landing maneuver. The images are merged in a way to reduce distortions in parallax in the merged image from the two vision systems. This way, the pilot is provided enhanced vision information supporting the safe completion of a landing maneuver.

Figure 1:
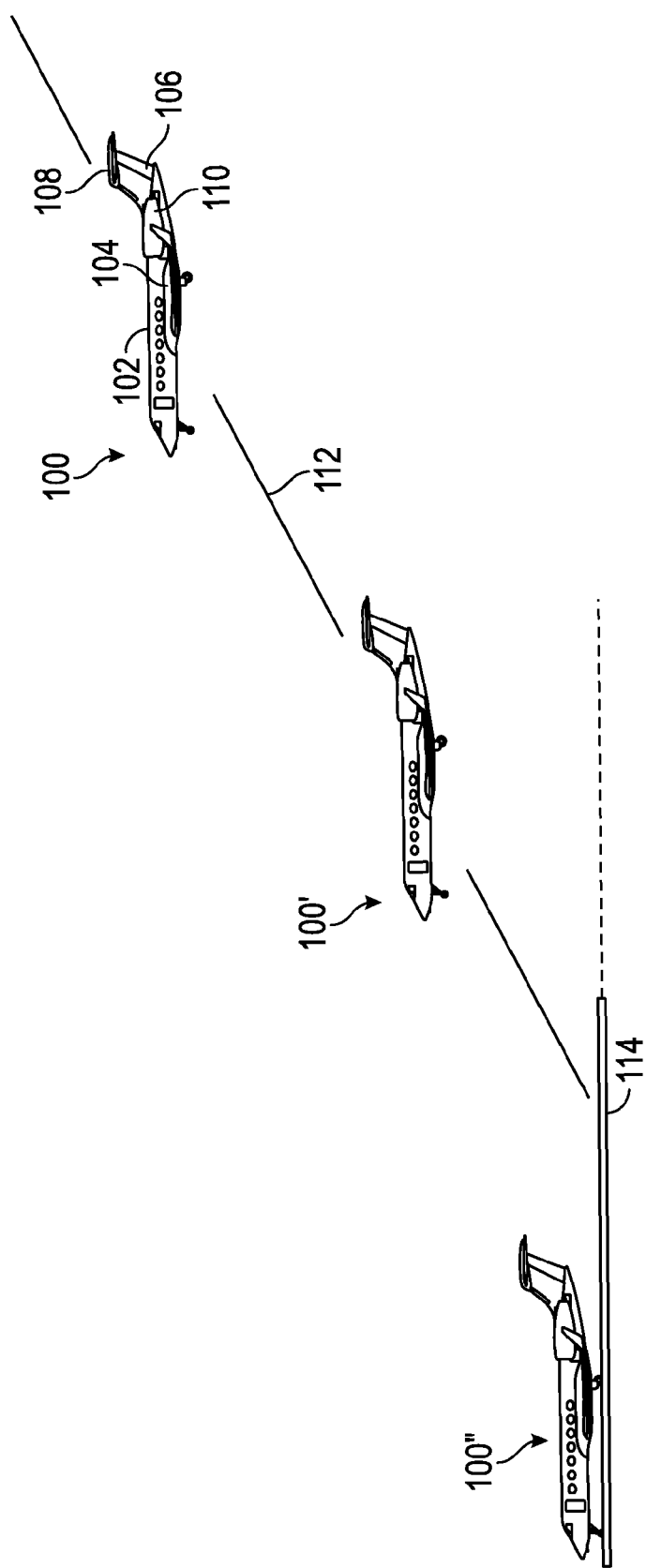
FIG. 1 is a view of an aircraft performing a landing maneuver in which the disclosed embodiments can be implemented in accordance with one non-limiting implementation.

FIG. 1 is a view of an aircraft 100 performing a landing maneuver in which the disclosed embodiments can be implemented in accordance with one exemplary, non-limiting implementation. In accordance with one non-limiting implementation of the disclosed embodiments, the aircraft 100 includes fuselage 102, which holds the passengers and the cargo; two main wings 104, which provide the lift needed to fly the aircraft 100; a vertical stabilizer 106 and two horizontal stabilizers 108, which are used to ensure a stable flight; and two jet engines 110, which provide the thrust needed to propel the aircraft 100 forward. Flight control surfaces are placed on wings 112, horizontal stabilizers 116, and vertical stabilizers 114 to guide the aircraft 100. As shown in FIG. 1, the aircraft 100 performs landing maneuver by navigating along a glideslope 112 towards a runway 114. As the aircraft 100 proceeds along the glideslope 112 to the position of aircraft 100' and then to the position of aircraft 100", the gain of an infrared vision system and an active millimeter wave vision system are automatically adjusted by a processor onboard the aircraft, merged, and presented to a pilot by a display which in some embodiments is a heads-up display.

Although not shown in FIG. 1, the aircraft 100 also includes various onboard computers, aircraft instrumentation and various control systems. These onboard computers can include flight control computers and the aircraft instrumentation can include various sensors that make up portions of an avionics system as will now be described with reference to FIG. 2.

Figure 2:
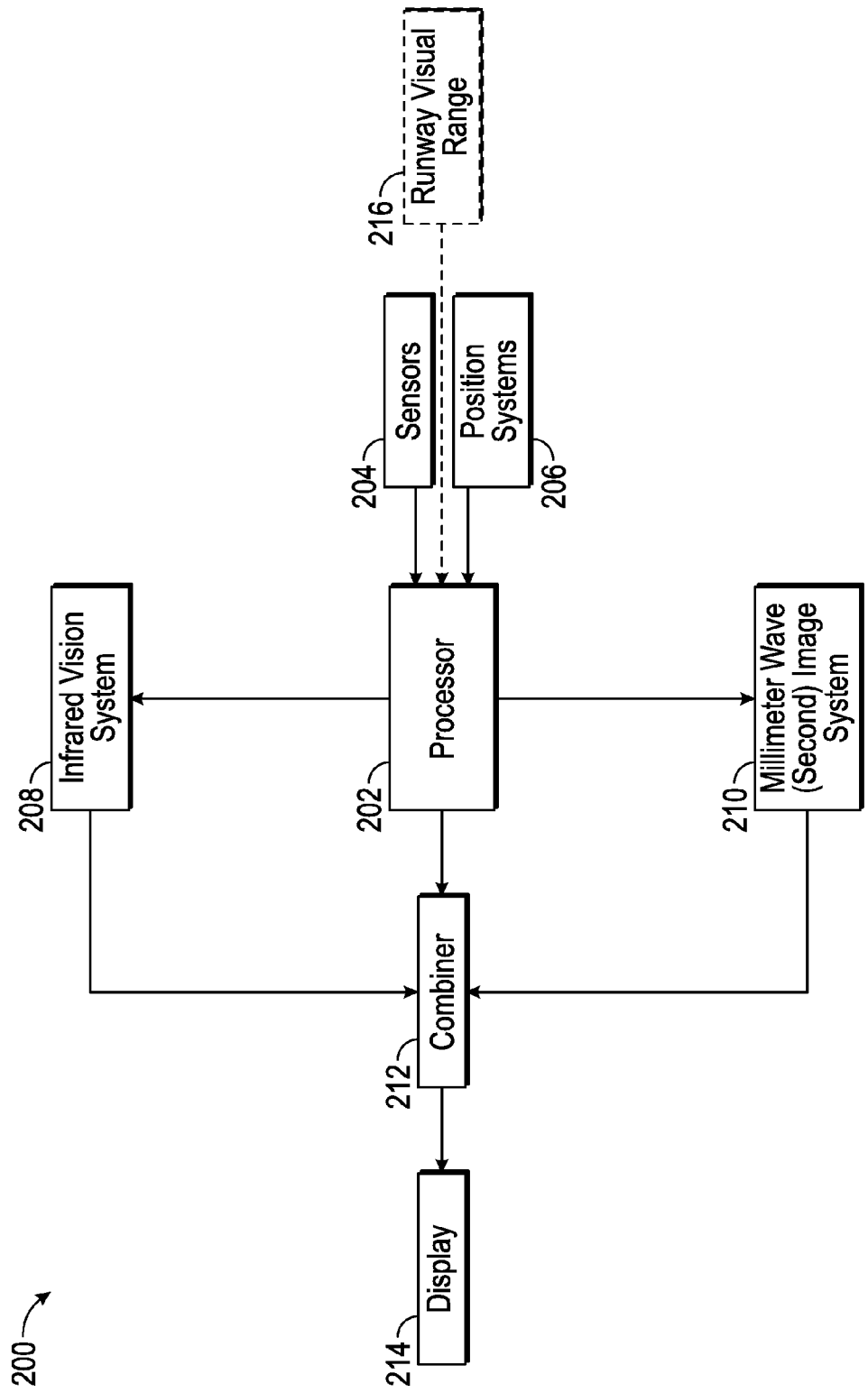
FIG. 2 is a block diagram of an advanced aircraft vision system in accordance with one non-limiting implementation.

FIG. 2 is a block diagram of an advanced aircraft vision system 200 in accordance with an exemplary implementation of the disclosed embodiments. The vision system 200 comprises various sensors 204, one or more position systems 206, and infrared vision system 208, second image system 210, a combiner 212 and a display 214 which in some embodiments comprises a heads-up display. Although not illustrated, it will be appreciated that an aircraft can include any appropriate number of redundant systems or any number of the sub-systems that make up the vision system 200.

The sensors 204 can include, for example, air data sensors, air data reference (ADR) components or sensors, acoustic sensors (e.g., sound, microphone, seismometer, accelerometer, etc.), vibration sensors, aircraft sensors (e.g., air speed indicator, altimeter, attitude indicator, gyroscope, magnetic compass, navigation instrument sensor, speed sensors, angular rate sensor, etc.), position, angle, displacement, distance, speed, acceleration sensors (e.g., accelerometer, inclinometer, position sensor, rotary encoder, rotary/linear variable differential transformer, tachometer, etc.). The sensors 204 can also include pitot and static pressure sensors that can be used to measure Ram air pressure and static pressures, and provide data or information that can be used to determine/compute airspeed, Mach number, angle of attack, temperature and barometric altitude data, etc. The position systems 206 can include Global Positioning System (GPS), Global Navigation Satellite System (GNSS), or other satellite based sensor systems.

According to the disclosed embodiments, the computer 202 uses data provided by the sensors 204 and/or the positioning systems 206 to determine the position of the aircraft during the landing maneuver. In a non-limiting example, the computer may determine the position of the aircraft relative to a runway using a GPS system to determine the distance of the aircraft from the runway. Since the approach patterns and glideslopes of runways are documented and available to the pilot, the computer 102 can also determine the aircraft position relative to the runway by receiving data of the aircraft altitude and using trigonometric equations as is known in the art. Responsive to determining the aircraft's position relative to the runway, the computer 102 adjust the gain of the infrared vision system and the millimeter wave image system since the systems have different effective ranges to provide the best possible image to the pilot. Optionally, Runway Visual Range (RVR) data can also be used to supplement the gain control process of the infrared vision system 208 and the second vision system 210.

The gain adjusted images are combined in combiner 212 to provide a merged image to the display 214. Merger or fusion of two video images is well known in the art and any suitable fusion process may be employed following the teachings of the disclosed embodiments. Depending upon the technology chosen for the second vision system 210, one fusion process may be preferred over another as will be appreciated and understood by those skilled in the art.

After the infrared image and the MMW image are merged in the combiner 212, the merged image is presented to the pilot on display 214, which in some embodiments comprises a heads-up display. According to disclosed embodiments, the pilot has the option to manually select either the infrared vision system 208 or the MMW image system 210 or may select an automatic mode in which the gain adjustments of the infrared vision system 208 and the MMW vision system 210 are automatically adjusted by the computer 202 responsive to determining the aircraft's position relative to the runway during the approach maneuver.

Figure 3:
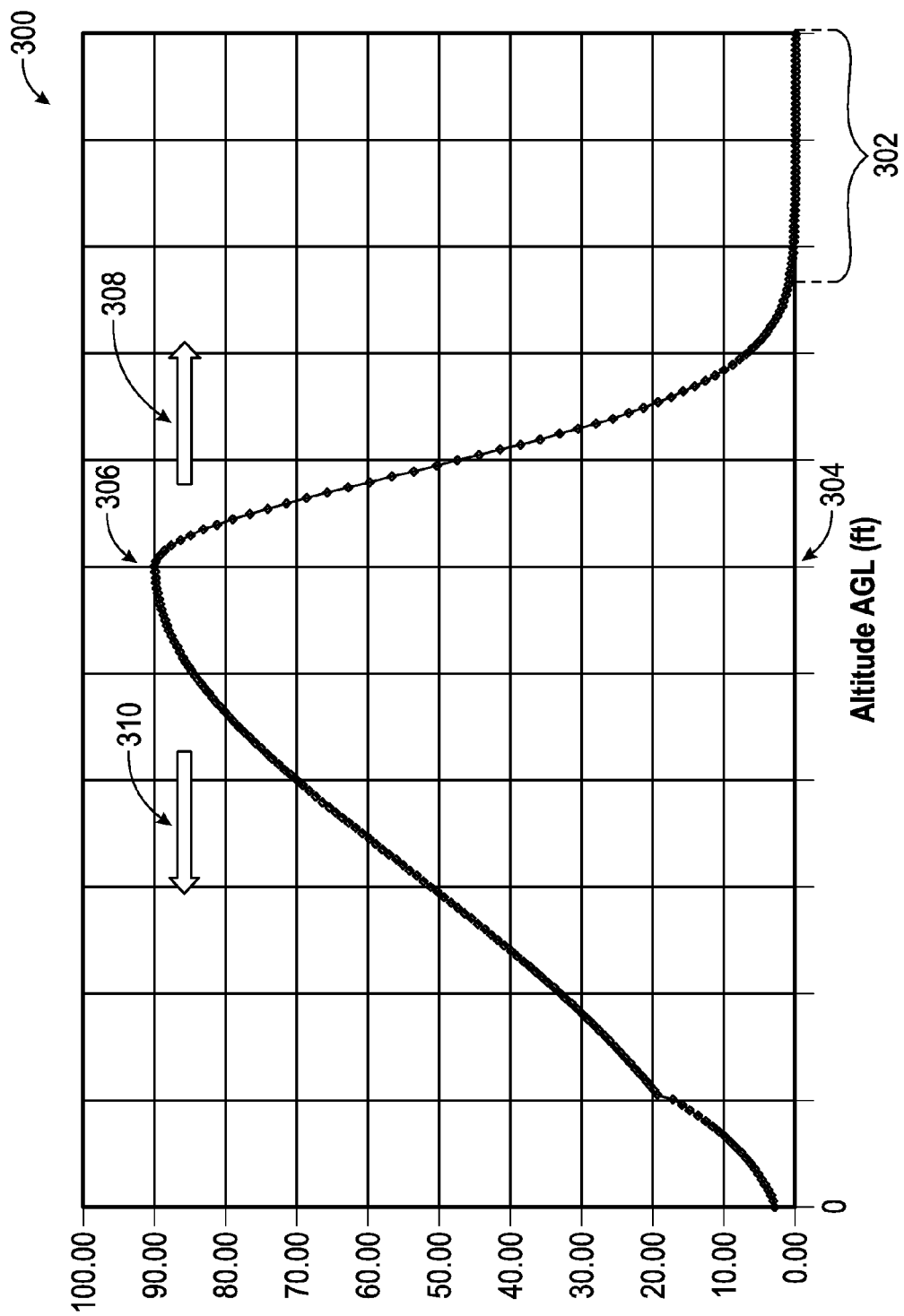
FIG. 3 is a gain control diagram in accordance with an exemplary implementation of the disclosed embodiments.

With continued reference to FIG. 2, FIG. 3 is an illustration of the gain control (scheduling) curve 300 for the MMW (second) image system 210. It will be appreciated that the gain control curve for the infrared vision system 208 is the corresponding curve that produces a merged image having a 100% gain factor. Accordingly, the disclosed embodiments give priority to the infrared vision system 208 by setting the gain of the MMW vision system 210 at or near zero until approximately 200 feet prior in altitude 304 where effectiveness of the second vision system peaks 306. As the aircraft nears the runway along the glideslope, the gain of the infrared vision system 208 and the MMW vision system 210 are adjusted according to the gain control curve 300 by the computer 202. As the aircraft nears touchdown, priority is again returned to the infrared vision system 208 is a computer rapidly reduces the gain of the MMW image system as illustrated in FIG. 3. In some embodiments, the gain control (scheduling) curve 300 is shifted based upon Runway Visual Range (RVR) data. As a non-limiting example, at higher RVR (e.g., 1200) the gain control curve may shift as indicated by the arrow 308. At lower RVR (e.g., 500) the gain control curve may shift as indicated by the arrow 310 since the infrared image system would be less effective at lower RVR. As will be appreciated, the actual RVR shift point, and the amount of gain control curve shift, will depend upon the technology selected for the second vision system 210. Generally, the disclosed embodiments offer the most advantages in low visibility conditions, where the pilot may not be able to see the runway or runway conditions solely with the infrared image system 208 with the unaided eye (i.e., lower RVR).

Figure 4:
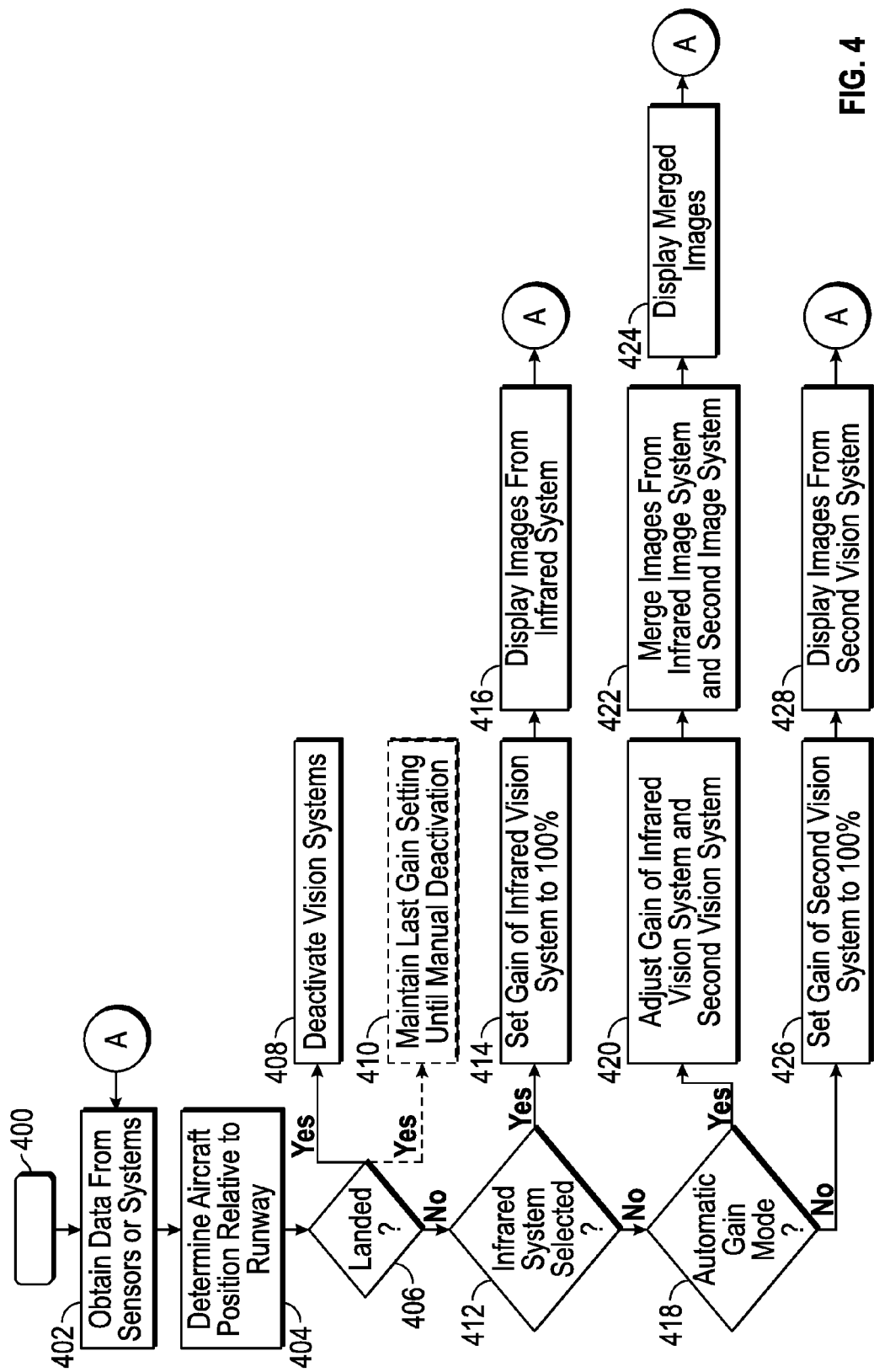
FIG. 4 is a flow diagram of a method in accordance with one exemplary implementation of the disclosed embodiments.

FIG. 4 is a flow diagram illustrating a method 400 in accordance with one exemplary implementation of the disclosed embodiments. FIG. 4 will be described with reference to certain components described in conjunction with FIG. 2.

The routine begins in step 402 where the computer 202 obtains data from the sensors 204 or position systems 206. The sensors 204 can include, without limitation, one or more of acoustic sensors (e.g., sound, microphone, seismometer, accelerometer, etc.), vibration sensors, air data sensors (e.g., air speed indicator, altimeter, attitude indicator, navigation instrument sensor, speed sensors, angular rate sensors, etc.), position, angle, displacement, distance, speed, acceleration sensors (e.g., inclinometer, position sensor, rotary encoder, rotary/linear variable differential transformer, tachometer, etc.). The position systems 206 can include Global Positioning System (GPS), Global Navigation Satellite System (GNSS), or other satellite based sensor systems. In step 204, the computer 202 determines the aircraft's position relative to the runway. As discussed above, this can be done by determining the aircraft's distance from the runway or by determining the aircraft's altitude along the glideslope. Decision 406 determines whether the aircraft has landed. An affirmative decision indicates the aircraft has completed the landing maneuver and the vision system can be deactivated in step 408. Optionally, the vision system 200 can remain active after landing and during taxing the aircraft as indicated in step 410.

If the determination of decision 406 is at the aircraft has not landed, decision 412 determines whether the pilot has manually selected the infrared vision system 212. If so, the computer 202 will set the gain of the infrared vision system to 100% and the gain of the MMW (second) vision system two zero, and proceed to display images from the infrared vision system in step 416. Thereafter the routine loops back to step 402 until the aircraft has landed. If the determination of decision 412 is that the infrared vision system has not been manually selected, the routine proceeds this rescission 418 which determines whether the automatic gain control mode has been selected. If not, the computer 202 was at the gain of the second vision system to hundred percent and the gain of the infrared vision system 208 to zero and proceed to display images from the second vision system on the display 214. Again, the routine loops back to step 402 until the aircraft has landed.

If the determination of decision 418 is that the automatic gain control mode has been selected, step 420 adjust the gain of the infrared vision system 208 and the AMMW vision system 210 according to the gain control curve (schedule), which may be optionally supplemented by RVR data if available. See FIG. 3 for one non-limiting example. After gain adjustment, the images from the infrared vision system 208 and the second vision system 210 are merged in the combiner 212 following the fusion method described above. The merged images are displayed to the pilot in step 424 and the routine loops back to step 402 and continues until the aircraft has landed.

The disclosed embodiments can provide an aircraft with enhanced safety than those that utilize previous vision systems. By providing a pilot with an advanced aircraft vision system that adapts the contribution of an infrared vision system within active millimeter wave vision system the disclosed embodiments provide the advantages of both systems given their differing affective ranges and advantages.

Those of skill in the art would further appreciate that the various illustrative logical blocks/tasks/steps, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. For example, although the disclosed embodiments are described with reference to advanced aircraft vision system for an aircraft, those skilled in the art will appreciate that the disclosed embodiments could be implemented in other types of vehicles including, but not limited to, surface ships, automobiles, trains, motorcycles, etc. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

The invention claimed is:

1. In an aircraft performing a landing maneuver, a method for enhancing pilot vision, comprising:
   receiving, by a processor onboard the aircraft, data from sensors or systems onboard the aircraft at least one of the sensors or systems providing an aircraft altitude;
   (a) determining, by the processor, a position of the aircraft relative to a runway using the data;
   (b) adjusting the gain of a first vision system according to a gain control curve based upon the aircraft altitude to provide an adjusted first image;
   (c) adjusting the gain of a second vision system according to a corresponding opposite gain control curve based upon the aircraft altitude to provide an adjusted second image;
   (d) merging the adjusted first image and the adjusted second image to provide a merged image;
   (e) displaying the merged image; and
   (f) repeating steps (a)-(e) until the aircraft has completed the landing maneuver.

2. The method of claim 1, wherein determining the position of the aircraft comprises determining, by the processor, the position of the aircraft relative to a runway using data from an altitude sensor.

3. The method of claim 1, wherein determining the position of the aircraft comprises determining, by the processor, the position of the aircraft relative to a runway using data from a positioning system.

4. The method of claim 1, wherein adjusting the gain of the first vision system comprises adjusting the gain of an infrared vision system to provide the adjusted first image.

5. The method of claim 1, wherein adjusting the gain of the second vision system comprises adjusting the gain of a millimeter wave vision (MMW) system.

6. The method of claim 1, wherein adjusting the gain of the second vision system further comprises adjusting a gain control schedule based upon runway visual range data.

7. The method of claim 1, wherein displaying the merged image comprises displaying the merged image on a heads-up display.

8. A vision system for an aircraft, comprising:
   a first image system for providing a first image;
   a second image system for providing a second image;
   sensors or systems for providing position data of the aircraft at least one of the sensors or systems providing an aircraft altitude;
   a processor coupled to the sensors or systems, the first image system and the second image system, the processor being configured to:
   determine a position of the aircraft relative to a runway;
   adjust the gain of the first image system according to a gain control curve based upon the aircraft altitude and the second image system according to a corresponding opposite gain control curve based upon the aircraft altitude;
   merge the first image and second image to provide a merged image; and
   display the merged on a display.

9. The vision system of claim 8, wherein the sensor comprises an altitude sensor.

10. The vision system of claim 8, wherein the system comprises a positioning system.

11. The vision system of claim 8, wherein the first vision system comprises an infrared vision system.

12. The vision system of claim 8, wherein the second image system comprises an millimeter wave vision system.

13. The vision system of claim 8, wherein the processor is configured adjust the gain of the first image system and the second image system based upon runway visual range data.

14. The vision system of claim 8, wherein the display comprises a heads-up display.

15. An aircraft, comprising:
   a fuselage having a cabin for providing air travel;
   engines to propel the aircraft during flight;
   a vision system, comprising:
   a first image system for providing a first image;
   a second image system for providing a second image;
   sensors or systems for providing position data of the aircraft at least one of the sensors or systems providing an aircraft altitude;
   a processor coupled to the sensors or systems, the first image system and the second image system, the processor being configured to:
   determine a position of the aircraft relative to a runway;
   adjust the gain of the first image system according to a gain control curve based upon the aircraft altitude and the second image system according to a corresponding opposite gain control curve based upon the aircraft altitude;
   merge the first image and second image to provide a merged image; and
   display the merged on a display.

16. The aircraft of claim 15, wherein the sensor comprises an altitude sensor.

17. The aircraft of claim 15, wherein the system comprises a positioning system.

18. The aircraft of claim 15, wherein the first vision system comprises an infrared vision system.

19. The aircraft of claim 15, wherein the second image system comprises an millimeter wave vision system.

20. The aircraft of claim 15, wherein the display comprises a heads-up display.

* * * * *